(12) United States Patent
Henderson

(10) Patent No.: US 8,720,759 B1
(45) Date of Patent: May 13, 2014

(54) BICYCLE ACCESSORY STORAGE SYSTEM

(71) Applicant: Neal Henderson, Escondido, CA (US)

(72) Inventor: Neal Henderson, Escondido, CA (US)

( * ) Notice: Subject to any disclaimer, the term of this patent is extended or adjusted under 35 U.S.C. 154(b) by 0 days.

(21) Appl. No.: 13/941,521

(22) Filed: Jul. 14, 2013

(51) Int. Cl.
*B62J 9/00* (2006.01)

(52) U.S. Cl.
USPC .................. 224/427; 224/275; 297/188.12

(58) Field of Classification Search
USPC ........ 224/427, 275, 433; 297/188.01, 188.12, 297/188.08
See application file for complete search history.

(56) References Cited

U.S. PATENT DOCUMENTS

| | | | |
|---|---|---|---|
| 3,771,827 A * | 11/1973 | Winfree | 297/188.08 |
| 4,712,592 A | 12/1987 | Brown | |
| 5,474,270 A | 12/1995 | Rixen et al. | |
| 5,893,501 A * | 4/1999 | Schwimmer | 224/427 |
| 7,008,012 B1 * | 3/2006 | Chang | 297/188.1 |
| 7,225,956 B2 * | 6/2007 | Lien et al. | 224/427 |
| 7,625,041 B2 * | 12/2009 | Bigolin | 297/195.1 |
| 7,712,827 B2 * | 5/2010 | Yu | 297/195.1 |
| 2008/0036171 A1 | 2/2008 | Vroomen et al. | |
| 2009/0039127 A1 | 2/2009 | Dacko | |
| 2012/0061435 A1 | 3/2012 | Lavery | |

\* cited by examiner

*Primary Examiner* — Justin Larson
*Assistant Examiner* — Phillip Schmidt
(74) *Attorney, Agent, or Firm* — Mark Wisnosky

(57) ABSTRACT

A bicycle accessory storage device and system are described. The device is comprised of an elongated bowl that is sized and shaped to mate to the bottom of a bicycle seat. The system includes the bowl and the bicycle seat.

17 Claims, 13 Drawing Sheets

BICYCLE ACCESSORY STORAGE SYSTEM

BACKGROUND OF THE INVENTION

1. Technical Field

The present invention relates to devices that enable a bicycle to maintain a more nearly ideal aerodynamic configuration as would be particularly beneficial to a rider participating in a bicycle racing event.

2. Related Background Art

The technologies underpinning bicycle racing have evolved rapidly over the past few decades resulting in new materials and devices for increasing the speed and efficiency of the racing system comprising the machine and its rider. The primary aims of these development activities have been twofold: 1) reducing the weight of a system element while maintaining minimum structural strength requirements and 2) reducing the aerodynamic drag of the racing system. In spite of these advances, the rider remains the single largest source of inefficiency, typically representing more than 80% of the total aerodynamic drag on the racing system, while the bicycle itself typically represents about 20% of the total drag, with the balance attributed to other mechanisms.

The physics of bicycle movement require that the aerodynamic drag force be proportional to the density of the surrounding fluid (air), the square of the velocity through the fluid, and the sum of the drag coefficients related to the rider and the bicycle. The drag coefficients are, in turn, related to the product of a dimensionless coefficient of drag that relates to the shape of an object and that object's frontal area exposed to the moving fluid stream. Thus, to reduce the aerodynamic drag force at a particular vehicle speed, one is led to reduce either or both of the frontal area and the coefficient of drag of the rider and the bicycle. Such has been the motivation behind the development of devices such as aerodynamically shaped frames, handle bars, wheels, brakes, etc. that act primarily to reduce the coefficient of drag of those elements of the bicycle. Similarly, the development of aerodynamically shaped helmets, skin suits, glasses and the like reduce the coefficient of drag of the rider.

Much improvement has been accomplished using these devices, but the nature of athletic competition is that all highly skilled riders train to benchmarks set by recent competitions, and arrive at a new race with remarkably similar physical capabilities. Improvements of a few percentage points attributable to their equipment can easily make the difference between winning and losing an important competition. Consequently, there is an ongoing need for innovation in this area.

Competitive bicycle racers commonly participate in races of extended duration as a test of endurance and stamina. These races typically require the cyclist to carry several accessories to improve their chances for completing the event. Accessories such as spare tires, tire filling devices, rain gear and multi-functional tools are commonly carried by participants in these events. Such accessories are typically either attached directly to the frame of the bicycle or are carried in storage devices that are attached to the frame. Accessories that are directly attached to the bicycle frame can directly increase the drag of the bicycle and are subject to the shock and vibration attendant with the rigors of the event. As such, these may cause the component attachment to loosen causing undesirable rattling or the potential loss of the accessory. Some common accessory storage devices are similarly directly attached to the bicycle frame and exhibit the same limitations and are exposed to the same hazards. The present invention comprises an innovation that reduces the coefficient of drag of the accessory storage device while providing an intrinsically shock-mounted attachment beneath the bicycle seat.

DISCLOSURE OF THE INVENTION

The present invention provides a storage device that overcomes the aforementioned drawbacks. One aspect of the invention discloses a bicycle accessory storage device that complements the aerodynamic shape of the bicycle frame and that is attached underneath the bicycle seat. The device includes an irregular, elongated bowl-like housing shaped to conform to the periphery of the particular style of seat employed by the cyclist and including an opening in its bottom surface to allow it to be installed over the seat post while providing additional spacing to accommodate the movement of the seat, and an attachment means to hold it securely to the underside of the seat. Thus, the bicycle seat becomes the cover for a sealed accessory storage device.

DETAILED DESCRIPTION

Figure 1:
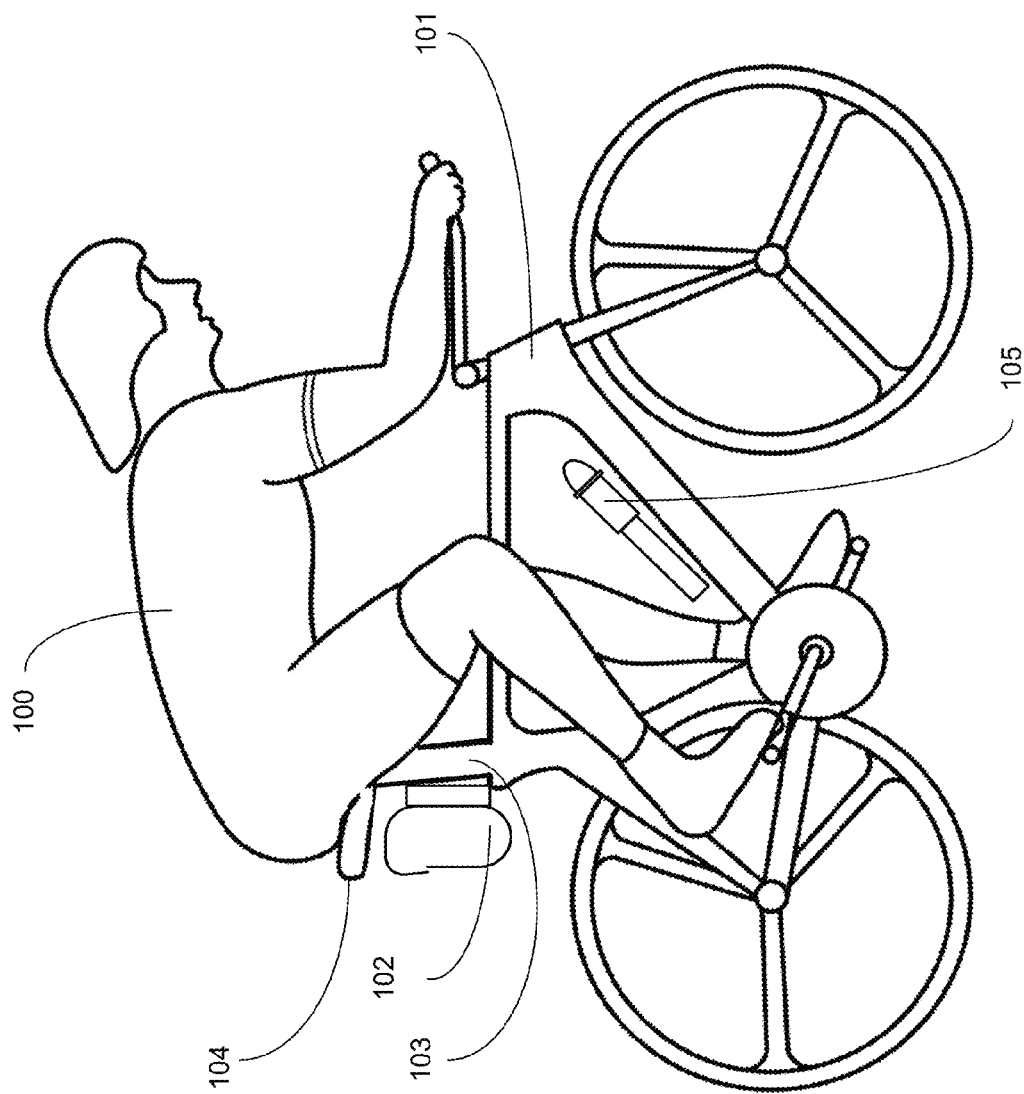
FIG. 1 shows a bicycle rider in a conventional riding position on a bicycle having conventional accessories attached to the bicycle frame.

FIG. 1 depicts the prior art and shows a rider 100 on a bicycle 101 in a conventional racing configuration including a rear accessory storage pack 102 attached to the seat post 103 supporting seat 104, and a conventional tire pump 105 attached to the bicycle frame. Note that both accessories can generate turbulence, thus contributing to increased drag.

Figure 2:
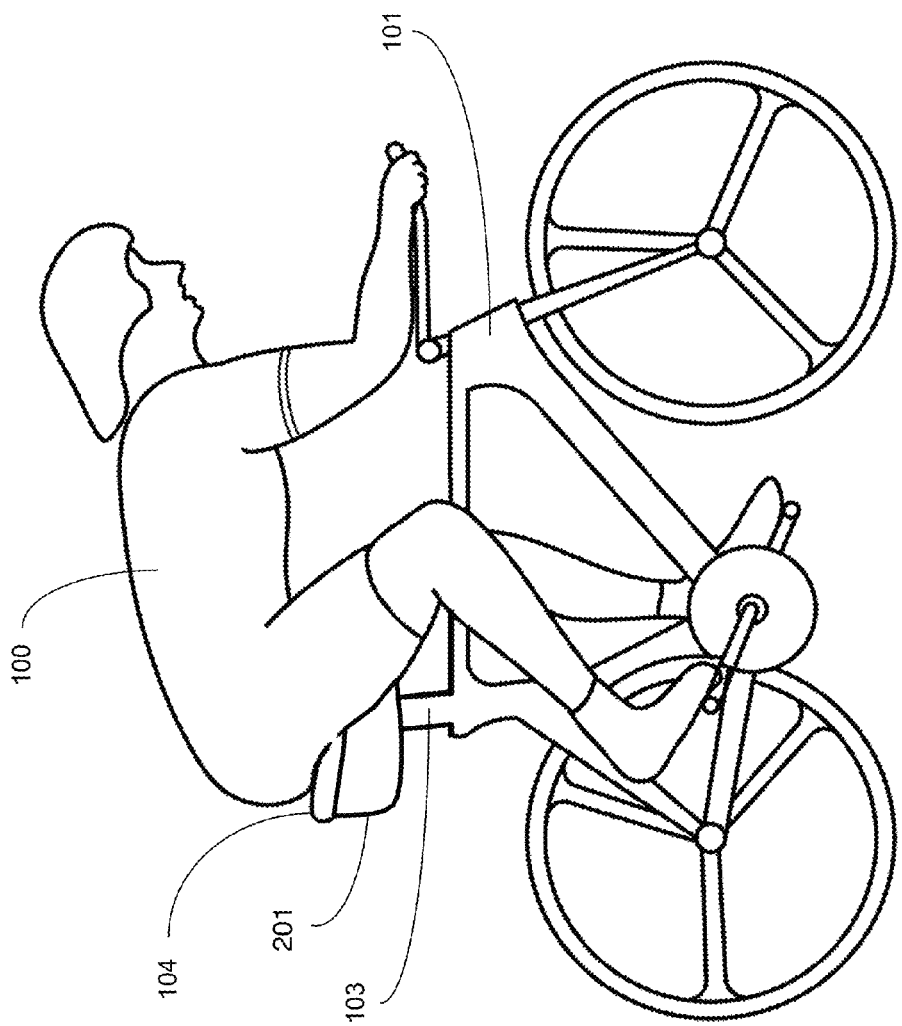
FIG. 2 shows a bicycle rider on a bicycle having an accessory storage device attached to the bicycle seat.

FIG. 2 shows a bicycle employing the accessory storage device 201 to stow all accessories in a storage device attached beneath the bicycle seat 104.

Figure 3:
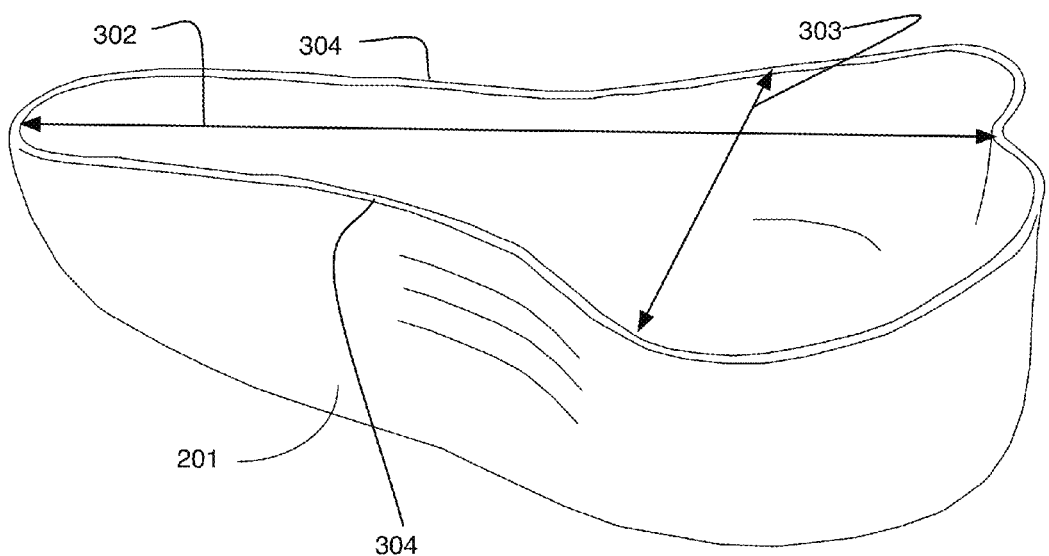
FIG. 3 shows top and bottom isometric views of the accessory storage device.
Figure 3:
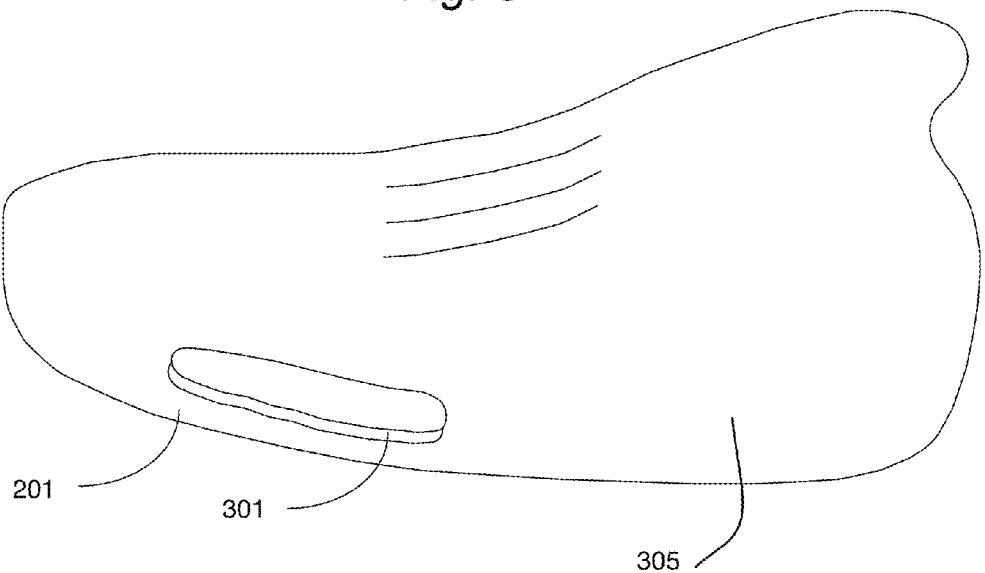

FIG. 3A shows a top isometric view of an embodiment of the accessory storage device 201 comprising an irregular bowl shaped vessel shaped to conform to the periphery of a specific seat model. FIG. 3B shows a bottom isometric view of an embodiment of the accessory storage device 201 including an opening 301 in its bottom surface to allow it to be installed over the seat post 103 while providing additional spacing around the seat post to accommodate the movement of the seat during the race. In the embodiment shown the opening is an elongated oval. In another embodiment the opening is circular. In another embodiment the opening is sized and shaped to accommodate the size and shape of the seat post. The accessory storage device 201 can be fabricated from plastic or metal sheet material by vacuum forming or from liquefied material by injection molding in an appropriate mold. The accessory storage device 201 is comprised of an elongated bowl shaped vessel having a longitudinal axis 302 and a transverse axis 303. The transverse axis 303 is perpendicular to the longitudinal axis 302. The storage device 201 is further comprised of a top edge 304 or lip of the bowl. The top edge is shaped to fit to the bottom of a bicycle seat. The device has a bottom 305 that is substantially sealed to form a bowl. An opening 301 is in the bottom 305 to allow the device to be installed over a bicycle seat post.

Figure 4A:
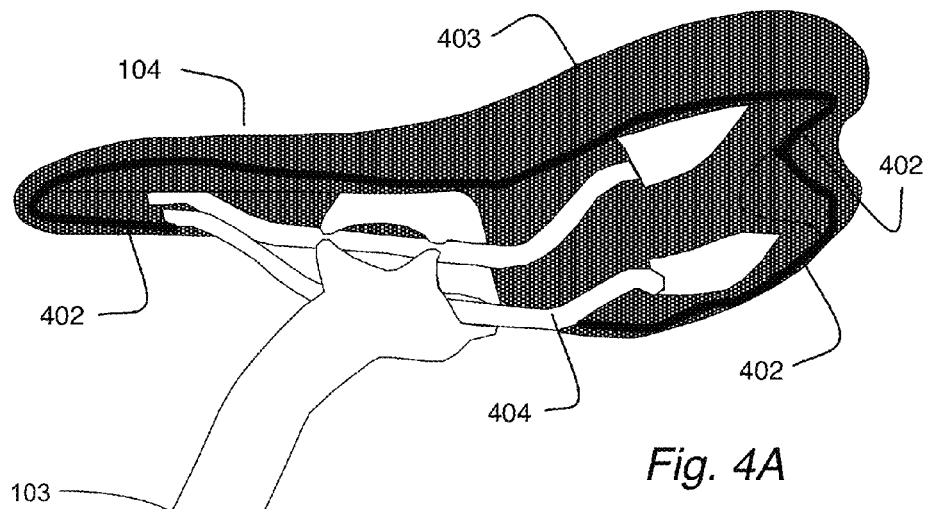
FIG. 4A shows a top isometric view of a conventional bicycle seat.
Figure 4B:
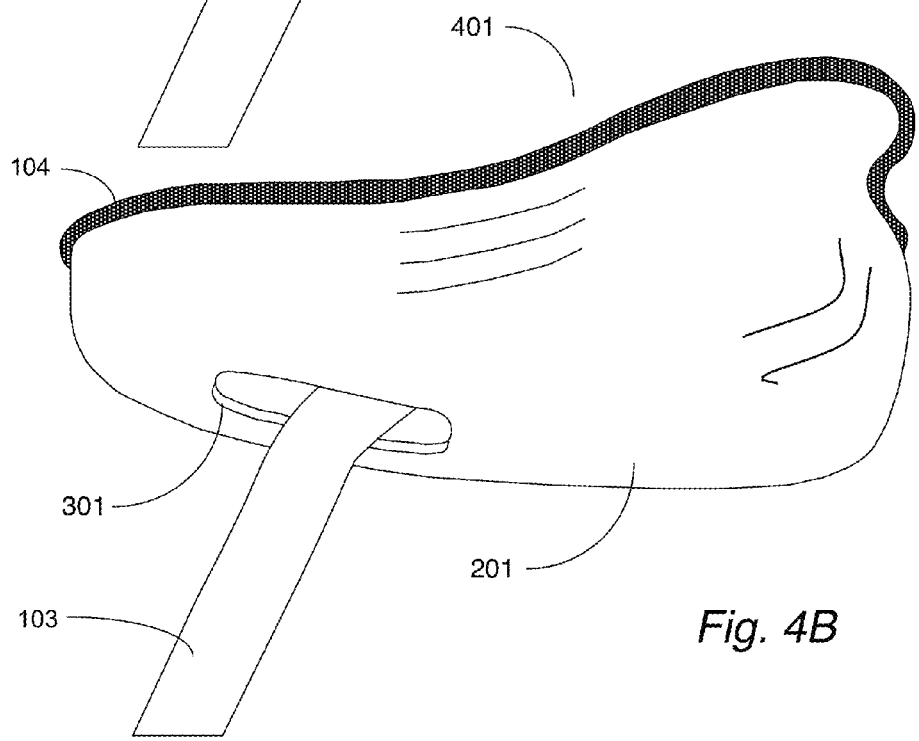
FIG. 4B shows a top isometric view of a bicycle accessory storage device using the accessory storage device.

FIG. 4A shows a bottom isometric view of a typical bicycle seat 104. The bicycle seat is comprised of a seating area 403, the seating area having a ridge 402 around the bottom. The bicycle seat further includes support rods 404 to which the seat post 103 is attached. In one embodiment the top edge 304 of the storage device is shaped to fit the ridge 402 on the bicycle seat. In another embodiment the seat and the storage device are designed in concert such that the two devices fit together as shown in FIG. 4B to form a bicycle storage system comprised of the storage device and the bicycle seat to which it is attached. FIG. 4B shows a bottom isometric view of the accessory storage device 401 wherein an embodiment of the accessory storage device 201 is mated to the underside of the bicycle seat 104. In one embodiment the invention includes both the seat and the storage device to form a storage system. In another embodiment the invention includes just the storage device 201 that is removably attached to the underside of a seat 104. In both of the aforementioned embodiments, the seat post 103 emerges through the opening 301 in the bottom of the device 201.

Figure 5A:
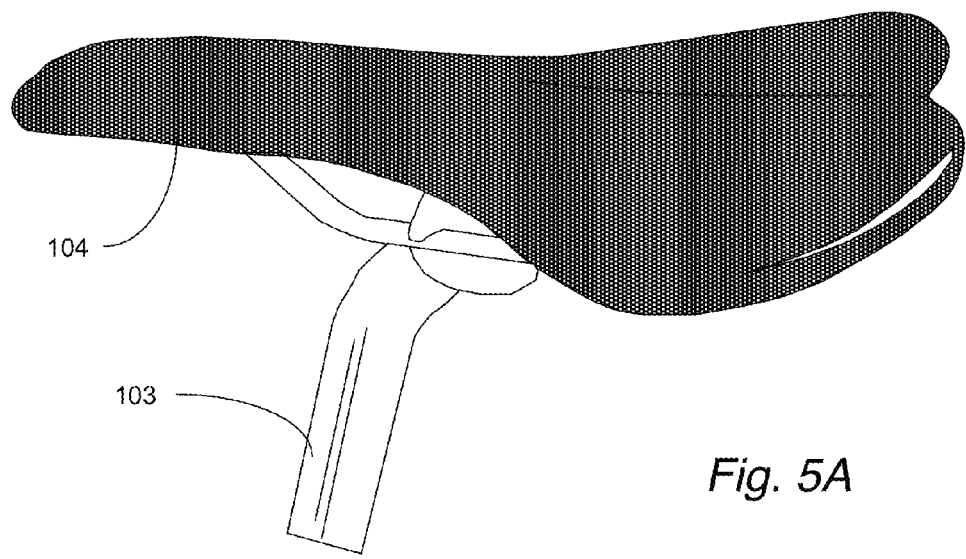
FIG. 5A shows a top isometric view of a conventional bicycle seat.
Figure 5B:
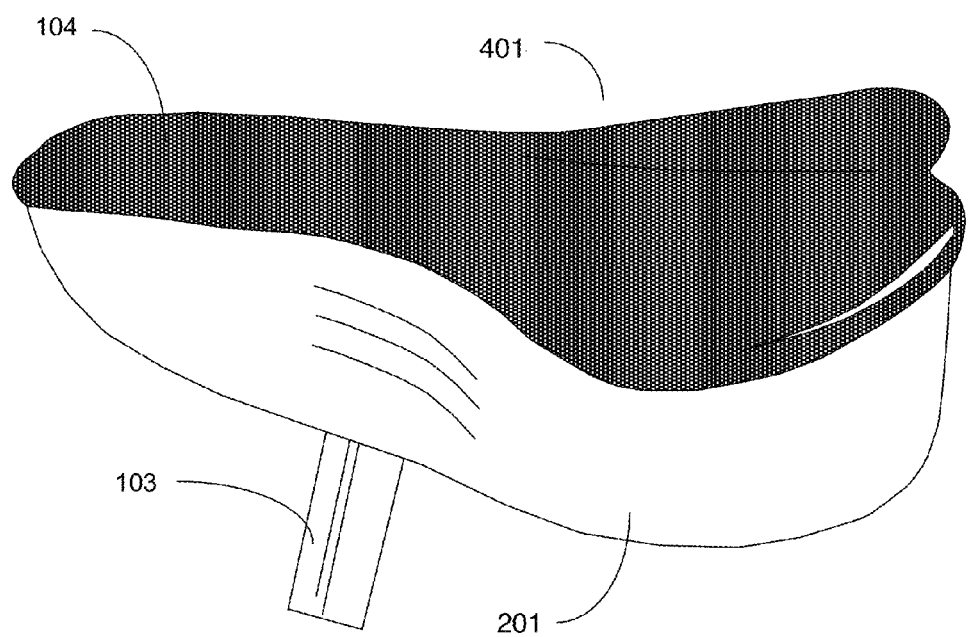
FIG. 5B shows a top isometric view of a bicycle accessory storage device using the accessory storage device.

FIG. 5 shows a top isometric view of a typical bicycle seat 104. FIG. 5b shows a top isometric view of the accessory storage device 401 wherein an embodiment of the accessory storage device 201 is mated to the underside of the bicycle seat 104. One embodiment is a storage system 401 that includes a bicycle seat 104 and a storage unit 201. A second embodiment includes the storage device 201 without the bicycle seat. In the preceding and following examples it should be understood that there are at least two embodiments a first comprising the storage device itself and a second including the storage device and a bicycle seat to which it attaches thereby forming a storage system. The features described herein can be applied to both the standalone storage device and to the storage system.

Figure 6:
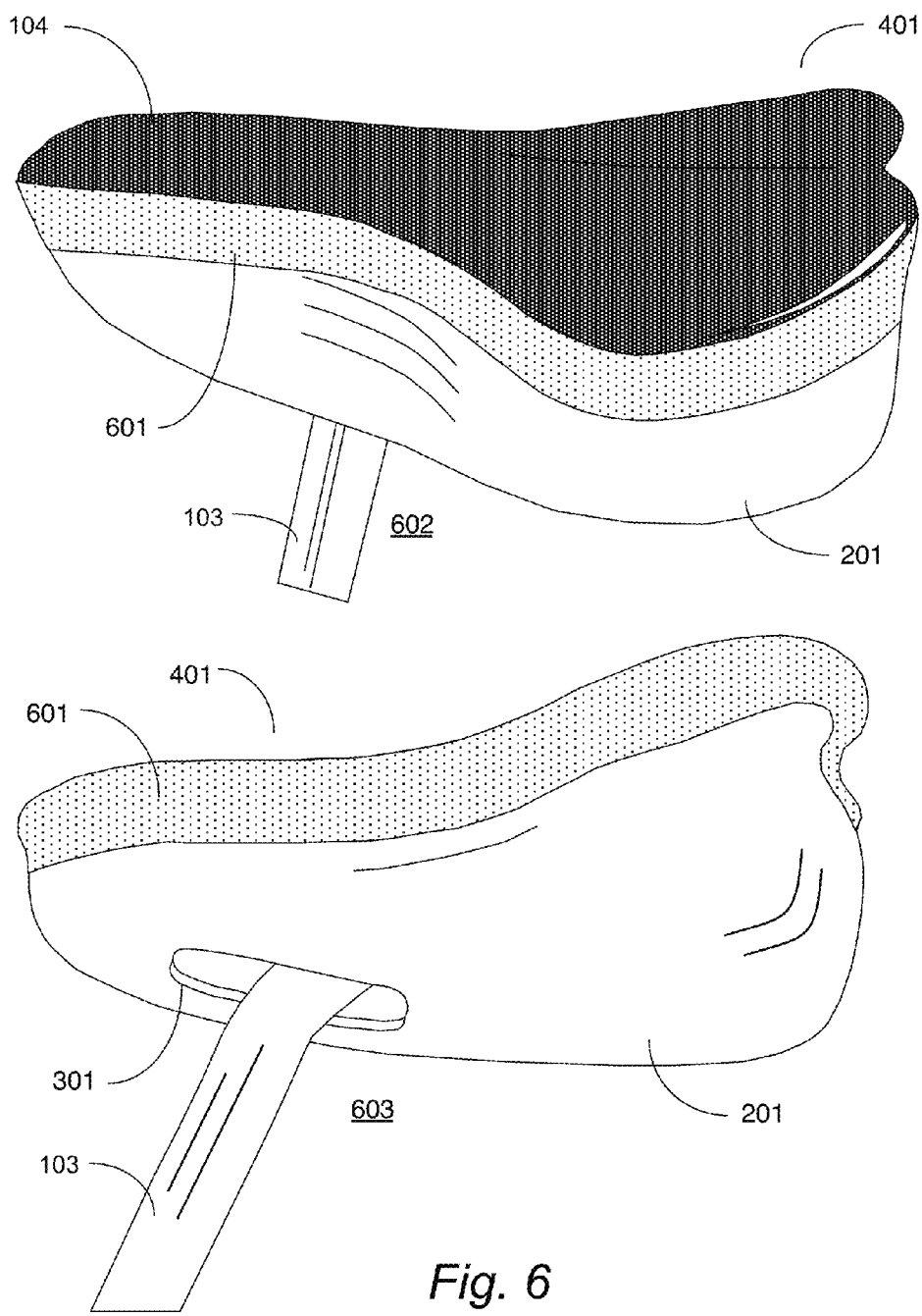
FIG. 6 shows top and bottom isometric views of a bicycle accessory storage device using the accessory storage device wherein the device is attached to the underside of the bicycle seat using flexible adhesive tape.

FIG. 6 shows top 602 and bottom 603 isometric views of the accessory storage device 401 employing an embodiment of the accessory storage device 201 wherein the device 201 is attached to the underside of the seat 104 using a strip of a flexible adhesive tape 601, such as the plastic tape know as "electrician's" tape.

Figure 7A:
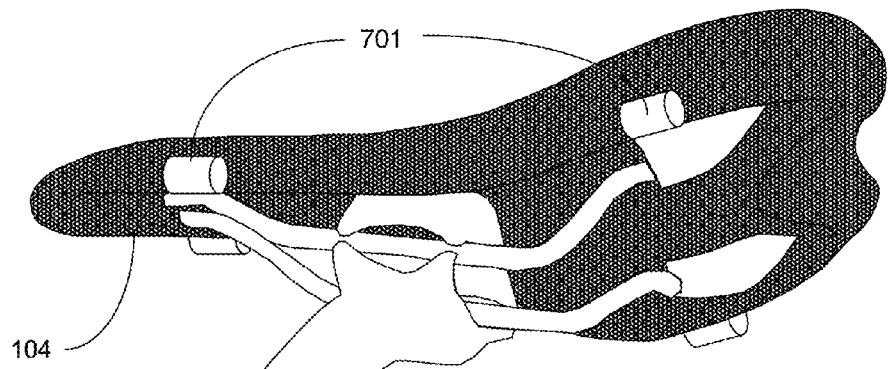
FIG. 7A shows a bottom isometric view of a conventional bicycle seat having attachments for Velcro® straps mounted on the underside of the seat.
Figure 7B:
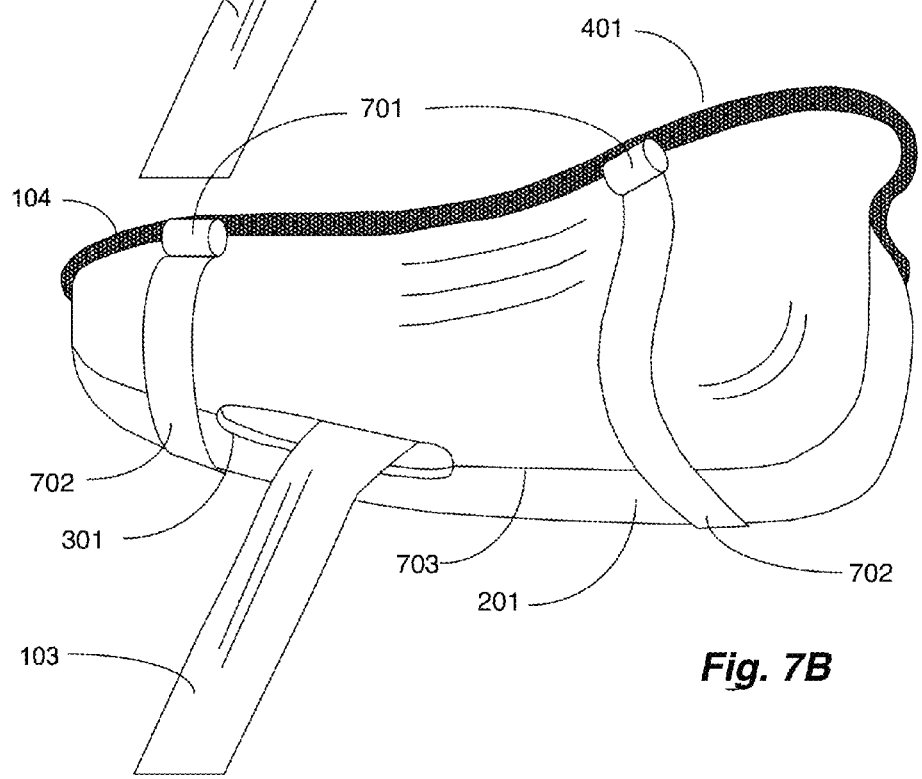
FIG. 7B shows a bottom isometric view of a bicycle accessory storage device using the accessory storage device wherein the device is split into halves and is attached to the underside of the bicycle seat using Velcro® strips connected to the attachments mounted on the underside of the seat.

FIG. 7 shows another embodiment of the invention wherein the storage device 201 is attached to the underside of the bicycle seat 104 using hook and latch strips 702 such as those sold by Velcro Industries. FIG. 7A shows attachment devices 701 for the hook and latch strips mounted to the underside of the bicycle seat 104. Nonlimiting examples of the attachment devices 701 include buckles, loops through which the hook and latch strip are threaded and the hook and latch strips attach to themselves, and, pieces of hook and latch material. FIG. 7B shows the hook and latch strips 702 connected to the attachment devices 701 and supporting the storage device 201. FIG. 7B also shows an embodiment of the storage device wherein it is split into two halves along seam 703. The seam is seen to run along the longitudinal axis 302 (see FIG. 3) of the storage device 201.

Figure 8A:
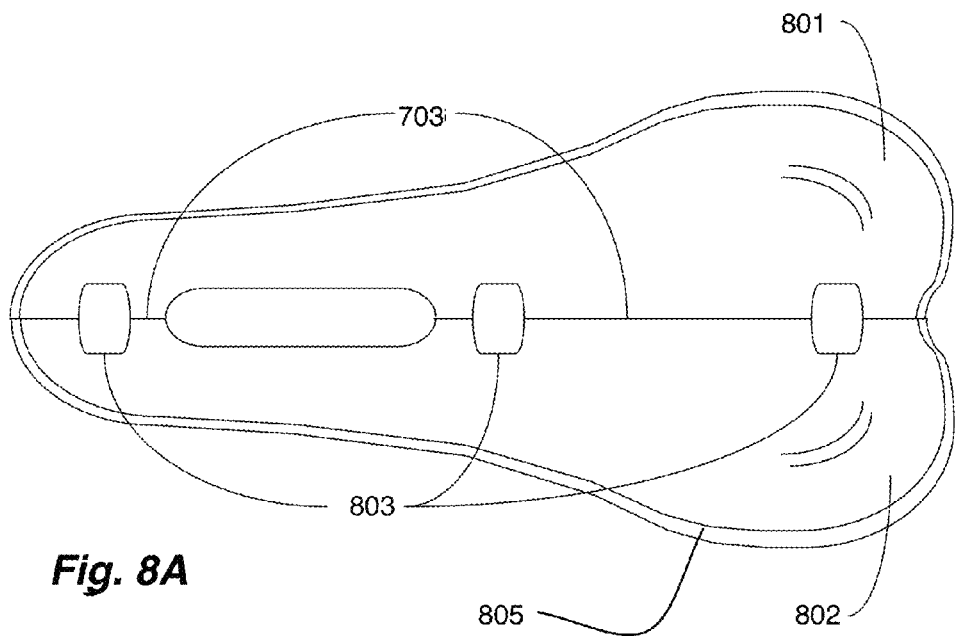
FIG. 8A shows a top view of an accessory storage device wherein the device is split into halves and the halves are held together using latching devices mounted on the bottom inside surface.
Figure 8B:
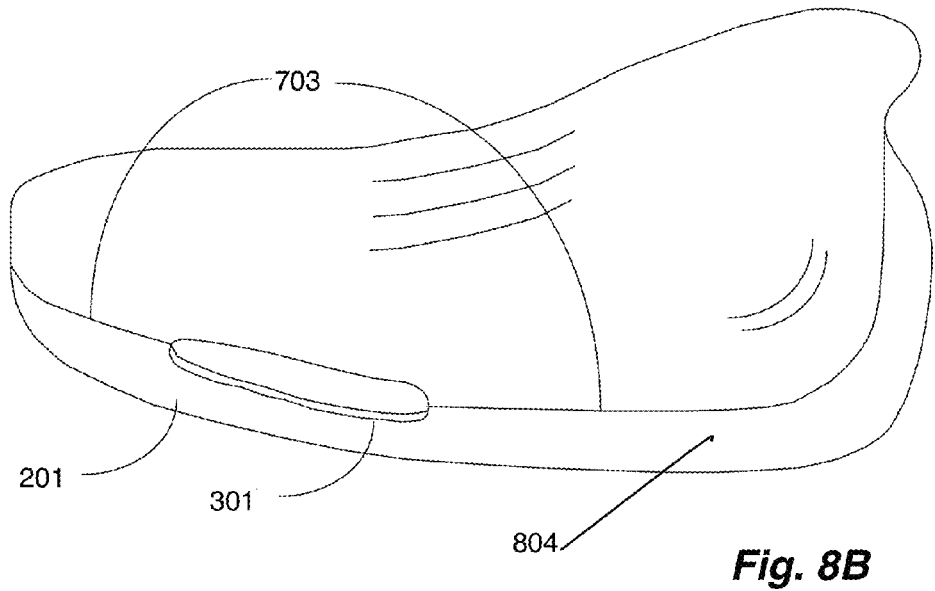
FIG. 8B shows a bottom isometric view of the accessory storage device shown in FIG. 8A.

FIG. 8A shows a top view of a storage device 201 wherein the device is split into halves 801, 802 and the halves 801, 802 are held together using attachment devices 803. Nonlimiting examples of attachment devices include hook and latch fasteners such as those sold by Velcro Industries, mechanical latches, snap fasteners, and, mechanical friction fittings. FIG. 8b shows a bottom isometric view of the device shown in FIG. 8a. The storage device is comprised of an elongated bowl shaped vessel 804. The structure is cut in half along the longitudinal axis 302 (see FIG. 3) to produce two half bowls 801 and 802. The half bowls are detachably connected to one another using attachment devices 803 as already described. The device may thereby be split into two halves and attached around the bicycle seat post (not shown in FIG. 8) without the need to remove the seat post from the bicycle. The bowl includes an upper edge 805 that is shaped and sized to fit to the bottom of a bicycle seat.

The use of mechanical friction fittings for attachment devices 803 allows the halves 801, 802 of the storage device 201 to be snapped together or pulled apart externally. This allows the storage device to be removed from the bicycle without having to remove the bicycle seat 104. In another embodiment the attachment 803 are magnets.

Figure 9:
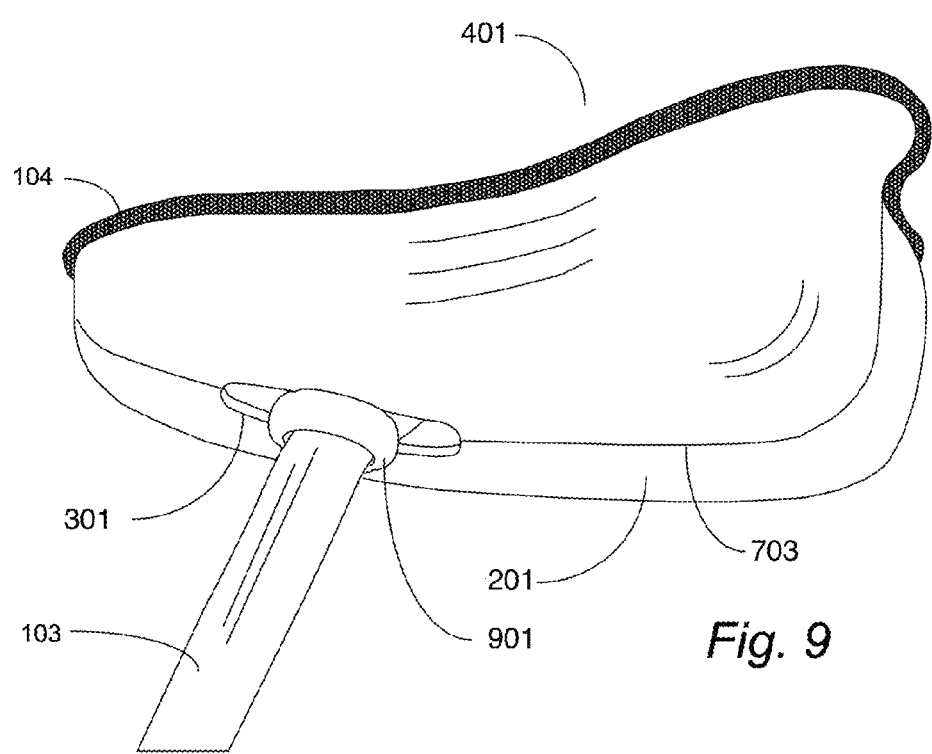
FIG. 9 shows a bottom isometric view of a bicycle accessory storage device using the accessory storage device wherein the device is split into halves longitudinally and is held against the underside of the bicycle seat using a gasket attached to the seat post.

FIG. 9 shows a bottom isometric view of an embodiment of the invention wherein the storage device 201 is held snugly against the underside of the bicycle seat 104 by means of a gasket 901 that is firmly attached to the seat post 103. The use of the gasket to hold the device 201 in place is applicable with a device that is split into two halves as shown but also to devices that are unitary as discussed earlier in conjunction with FIGS. 2-6.

Figure 10:
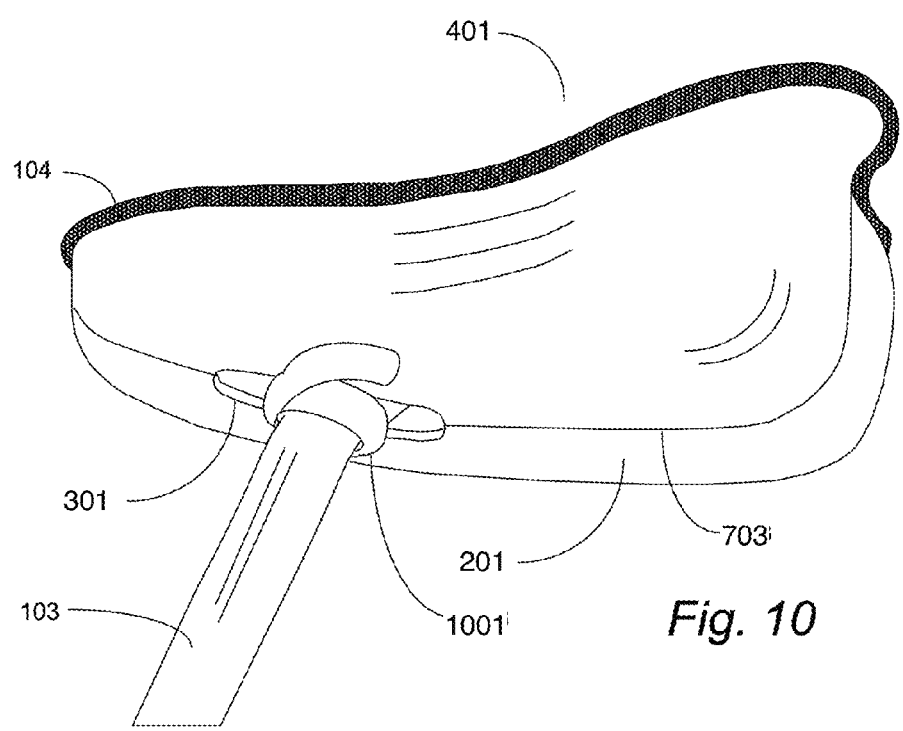
FIG. 10 shows a bottom isometric view of a bicycle accessory storage device using the accessory storage device wherein the device is split into halves longitudinally and is held against the underside of the bicycle seat using a quick-release attached to the seat post.

FIG. 10 shows a bottom isometric view of an embodiment of the invention wherein the storage device 201 is held snugly against the underside of the bicycle seat 104 by means of a quick-release fitting 1001 attached to the seat post 103. Again the quick-release mechanism may be used to hold all embodiments of the device in place.

Figure 11:
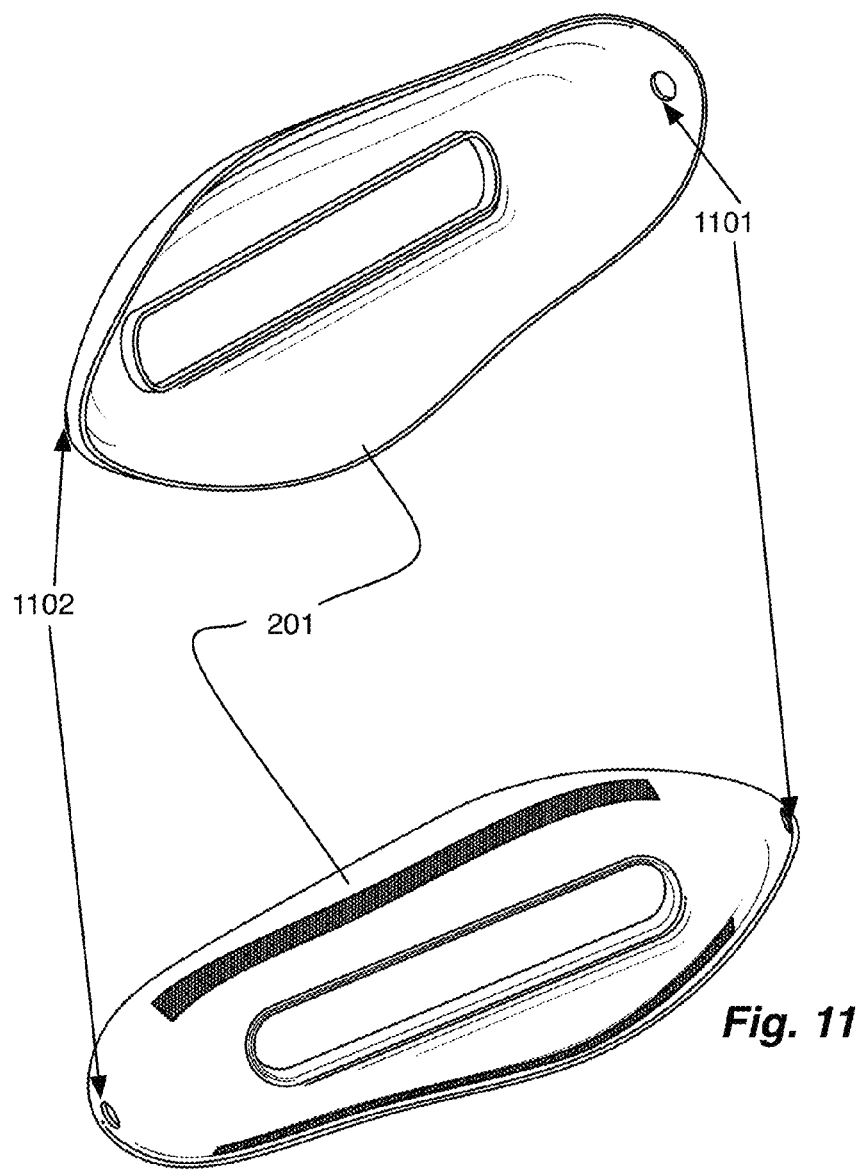
FIG. 11 shows top and bottom isometric views of an accessory storage device having holes located in the front and rear surfaces.
Figure 12:
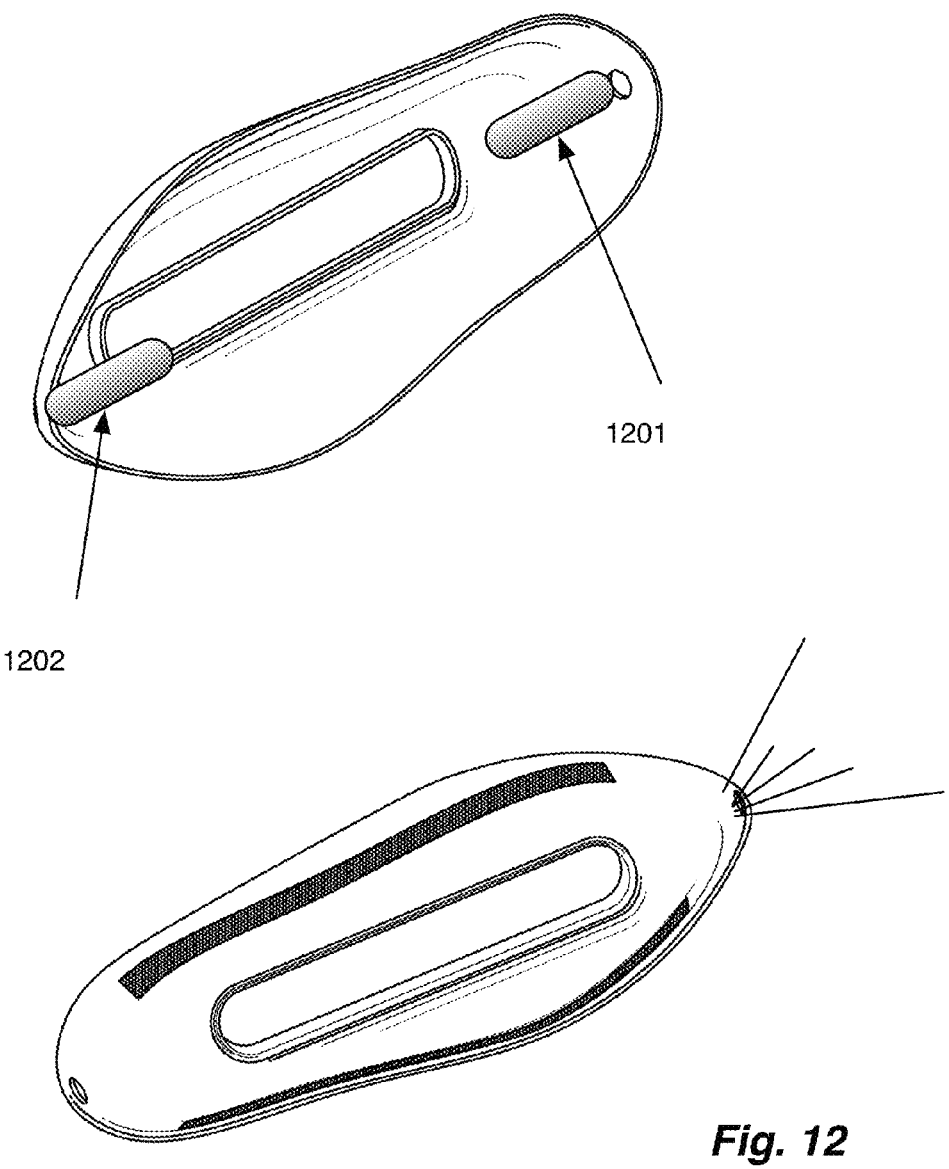
FIG. 12 shows top and bottom isometric views of an accessory storage device having electronic devices mounted internal to the storage device and adjacent to the holes located in the front and rear surfaces.

FIG. 11 shows an embodiment of the storage device 201 in which holes are located in the front 1102 and rear 1101 surfaces of the device. These holes allow active electronic devices to be mounted internally within the storage device that interact with the environment. FIG. 12 shows electronic devices 1201 and 1202 mounted adjacent to the rear and front holes, respectively. Nonlimiting examples of the electronic devices that might be installed within the storage device 201 include lights and cameras.

Figure 13A:
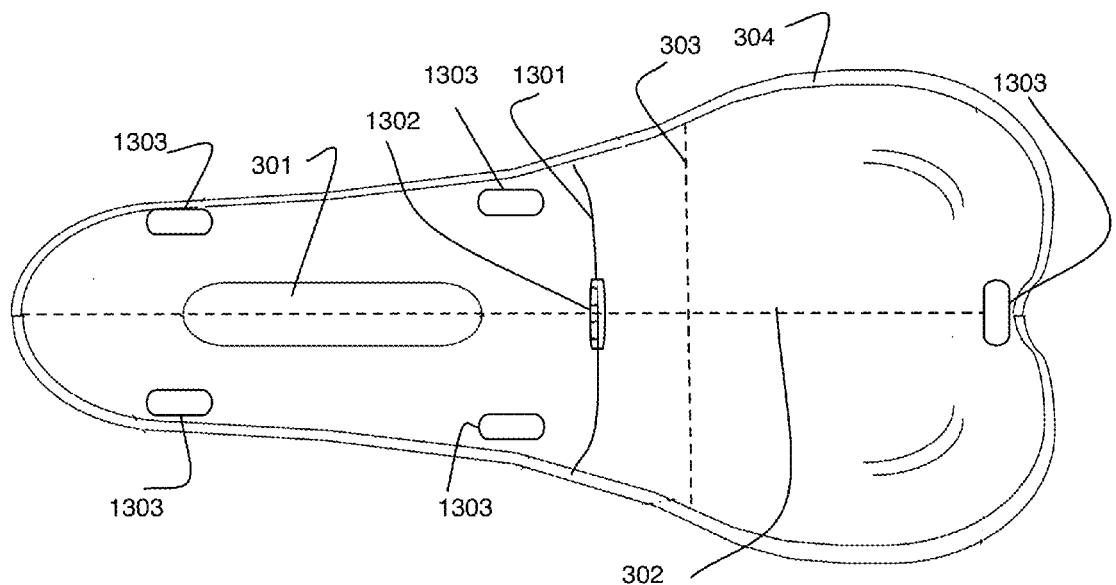
FIGS. 13A and 13B show a top view and a bottom isometric view respectively of a bicycle accessory storage device using the accessory storage device wherein the device is split into halves transversely and are held against the underside of the bicycle seat using mechanical interfaces.
Figure 13B:
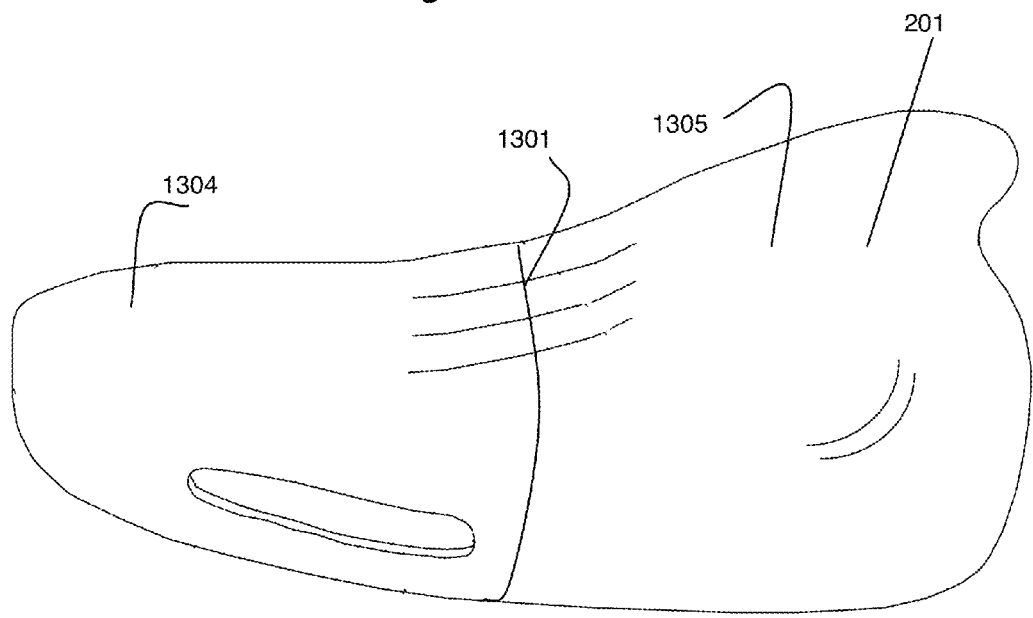

FIGS. 13A and 13B show top and bottom perspective views of yet another embodiment of the storage device invention. The storage device is comprised of an elongated bowl shaped structure 201 having a longitudinal axis 302 and a transverse axis 303. The device includes an upper edge 304 that is sized and shaped to fit to the bottom of a bicycle seat (not shown). The device further includes a plurality of attachment mechanisms 1303 that mate with attachment mechanisms attached to a bicycle seat to hold the device in place on the underside of the bicycle seat. Nonlimiting examples of the attachment mechanisms 1303 include flexible adhesive tape, mating hook and latch strips, latches, buckles, magnets and clips. In this embodiment the device is cut into two sections 1304, 1305 by a seam 1301. The seam is substantially parallel to the transverse axis 303. The seam in the embodiment shown in FIG. 13 is seen to be behind the opening 301 for the bicycle seat post. In another embodiment (not shown) the seam 1301 intersects the opening 301 such that the device 201 may be attached and removed from the bicycle seat without removing the seat post from the bicycle. In another embodiment the device further includes a hinge 1302 located to join the front portion 1304 with the rear portion 1305 of the device such that when attached to the underside of a bicycle seat the front portion 1304 or the rear portion 1305 may be separately opened for access to the interior of the device.

Another embodiment of the invention includes a method of providing a bicycle accessory storage device. The method includes forming a concave, bowl-like vessel open at the top and partially enclosed at the bottom for receiving at least one bicycle accessory, and shaping the vessel to cooperate with a bicycle seat so that the top opening conforms to a periphery of the bicycle seat. An opening is formed in the bottom of the vessel, and the method further provides a means for removably attaching the shaped vessel to the underside of the bicycle seat.

The present invention has been described in terms of the preferred embodiment and it is recognized that equivalents, alternatives and modifications, beyond those expressly stated, are possible and are within the scope of the attached claims.

A bicycle accessory storage device and system are described. The device is comprised of an elongated bowl that is sized and shaped to mate to the bottom of a bicycle seat. The system includes the bowl and the bicycle seat.

What is claimed is:

1. An accessory storage device for attachment to an underside of a bicycle seat said bicycle seat supported by a seat post, said device comprising:
    an irregular, elongated bowl shaped vessel having an elongated dimension and a transverse dimension, said vessel being open at a top and partially enclosed at a bottom, wherein the top opening is shaped to conform to a periphery of the bicycle seat and the bottom includes a hole capable of allowing penetration of the seat post through said bottom, said hole having dimensions larger than the diameter of the seat post to allow for movement of the seat post relative to the bottom of the vessel,
    means for removably attaching the vessel to the bottom surface of the bicycle seat so that the top opening of the vessel is in contact with the bottom surface of the bicycle seat and the seat post movably penetrates the bottom of the vessel, and,
    the means for attaching the storage device to the bottom surface of the bicycle seat is one selected from: flexible adhesive tape, mating hook and latch strips, latches, magnets and clips.

2. The storage device of claim 1 wherein the storage device is cut into two separate pieces.

3. The storage device of claim 1 wherein the storage device is held in contact with the bottom of the bicycle seat using a gasket attached to the seat post.

4. The storage device of claim 1 wherein the storage device is held in contact with the bottom of the bicycle seat using a quick-release fitting which contacts the bottom surface of the vessel and is clamped to the seat post.

5. The storage device of claim 2 wherein the device is cut along the elongated dimension of the device.

6. The storage device of claim 2 wherein the device is cut transverse to the elongated dimension of the device.

7. The storage device of claim 2 wherein the two separate pieces are held together using attachment means mounted on the two separate pieces of the storage device.

8. The storage device of claim 2 wherein the two separate pieces are held together by a hinge.

9. An accessory storage system for a bicycle said system comprising:
    a bicycle seat having a top and a bottom, the bottom having a periphery,
    an irregular, elongated bowl shaped vessel having an elongated dimension and a transverse dimension, said vessel being open at a top and partially enclosed at a bottom, wherein the top opening is shaped to conform to the periphery of the bicycle seat and the bottom includes a hole capable of allowing penetration of the seat post through said bottom, said hole having dimensions larger than the diameter of the seat post to allow for movement of the seat post relative to the bottom of the vessel,
    means for removably attaching the vessel to the bottom surface of the bicycle seat so that the top opening of the vessel is in contact with the bottom surface of the bicycle seat and the seat post movably penetrates the bottom of the vessel, and,
    the means for attaching the vessel to the bottom surface of the bicycle seat is one selected from: flexible adhesive tape, mating hook and latch strips, latches, magnets and clips.

10. The storage system of claim 9 wherein the vessel is cut into two separate pieces.

11. The storage system of claim 9 wherein the vessel is held in contact with the bottom of the bicycle seat using a gasket attached to the seat post.

12. The storage system of claim 9 wherein the vessel is held in contact with the bottom of the bicycle seat using a quick-release fitting which contacts the bottom surface of the vessel and is clamped to the seat post.

13. The storage system of claim 10 wherein the vessel is cut along the elongated dimension of the vessel.

14. The storage system of claim 10 wherein the vessel is cut transverse to the elongated dimension of the vessel.

15. The storage system of claim 10 wherein the two separate pieces are held together using attachment means mounted on the two separate pieces of the vessel.

16. The storage system of claim 10 wherein the two separate pieces are held together by a hinge.

17. A method of providing a bicycle accessory storage device comprising:

forming a concave vessel being open at a top and partially enclosed at a bottom to receive at least one bicycle accessory, shaping the vessel to cooperate with a bicycle seat so that the top opening conforms to a periphery of the bicycle seat, forming a hole in the bottom of the vessel to allow penetration of a seat post through the bottom of the vessel, said hole having dimensions larger than the diameter of the seat post to allow for movement of the seat post relative to the bottom of the vessel, and providing a means for removably attaching the shaped vessel to the underside of the bicycle seat, and, the means for attaching the vessel to the bottom surface of the bicycle seat is one selected from: flexible adhesive tape, mating hook latch strips, latches, magnets and clips.

* * * * *